(12) United States Patent
Brenner et al.

(10) Patent No.: US 9,015,636 B2
(45) Date of Patent: Apr. 21, 2015

(54) METHOD OF ENABLING A USER TO SELECT ONE OR MORE ITEMS FROM A COLLECTION OF ITEMS

(75) Inventors: Anna Cecilia Brenner, Amsterdam (NL); Peter Samuel Penning, Amsterdam (NL); Dirck Jan Heijting, Amsterdam (NL); Gregg Brian Heard, Amsterdam (NL)

(73) Assignee: Koninklijke Philips N.V., Eindhoven (NL)

( * ) Notice: Subject to any disclaimer, the term of this patent is extended or adjusted under 35 U.S.C. 154(b) by 378 days.

(21) Appl. No.: 13/123,074

(22) PCT Filed: Oct. 2, 2009

(86) PCT No.: PCT/IB2009/054318
§ 371 (c)(1),
(2), (4) Date: Apr. 7, 2011

(87) PCT Pub. No.: WO2010/041180
PCT Pub. Date: Apr. 15, 2010

(65) Prior Publication Data
US 2011/0191698 A1 Aug. 4, 2011

(30) Foreign Application Priority Data
Oct. 9, 2008 (EP) .................................. 08166195

(51) Int. Cl.
*G06F 3/048* (2013.01)
*G06F 17/30* (2006.01)

(52) U.S. Cl.
CPC .... *G06F 17/30398* (2013.01); *G06F 17/30873* (2013.01)

(58) Field of Classification Search
USPC .......................... 715/841, 853, 835, 854, 855
See application file for complete search history.

(56) References Cited

U.S. PATENT DOCUMENTS

| 6,014,639 A | 1/2000 | Fohn et al. | |
| 6,678,891 B1 * | 1/2004 | Wilcox et al. | ................... 725/42 |
| 2004/0083203 A1 | 4/2004 | Kemp | |

FOREIGN PATENT DOCUMENTS

| JP | H08241336 A | 9/1996 |
| JP | 2001325299 A | 11/2001 |
| JP | 2002318814 A | 10/2002 |

(Continued)

OTHER PUBLICATIONS

Inoue et al: "Dynamic Presentation Method of Advertising Contents Using Intentions Between Creator and Consumer in E-Commerce"; University of Hyogo, June 2009, 12 page Document.

*Primary Examiner* — Thanh Vu

(57) ABSTRACT

The method of the invention enables a user to select one or more items from a collection of items, said collection of items being organized in a hierarchy. The method comprises the steps of allowing the user to select a point in the hierarchy in a first view and allowing the user to select criteria from a list of criteria in a second view (21), the criteria being used to filter items (23) from the collection of items. The method further comprises the steps of determining which specific ones of said criteria match none of the items corresponding to said selected point in the hierarchy and unselecting said specific criteria in said second view (21). The device of the invention comprises electronic circuitry which is operative to perform the method of the invention. The computer program product of the invention enables a programmable device to perform the method of the invention.

9 Claims, 2 Drawing Sheets

(56) References Cited

FOREIGN PATENT DOCUMENTS

| JP | 2003296613 A | 10/2003 |
| JP | 2006260129 A | 9/2006 |
| JP | 2008008724 A2 | 1/2008 |
| WO | 0133315 | 5/2001 |

* cited by examiner

METHOD OF ENABLING A USER TO SELECT ONE OR MORE ITEMS FROM A COLLECTION OF ITEMS

FIELD OF THE INVENTION

The invention relates to a method of enabling a user to select one or more items from a collection of items, e.g. products from a product database, said collection of items being organized in a hierarchy.

The invention further relates to a device for enabling a user to select one or more items from a collection of items, e.g. products from a product database, said collection of items being organized in a hierarchy, the device comprising electronic circuitry.

The invention also relates to a computer program product enabling a programmable device to perform a method of enabling a user to select one or more items from a collection of items.

BACKGROUND OF THE INVENTION

Many companies allow a user to select one or more products from a product database on the Internet. For example, companies that provide online support for products sold under their brand and companies that sell products online. Often, the product database is organized in a hierarchy within which a user is allowed to navigate. Usually, each point in the hierarchy corresponds to a category or subcategory.

US 2004/0083203 discloses a method that allows a user to select criteria with which to filter products from a certain category of products.

A drawback of this approach is that only criteria are shown that are applicable to the selected category, which makes it more difficult for a user to understand the relationships between the categories.

WO 01/33315 describes that a when a user selects a first criterion, this may make a second criterion unavailable. WO 01/33315 does not disclose the combination of hierarchical navigation and selection of filter criteria or the interrelation between the two.

SUMMARY OF THE INVENTION

It is a first object of the invention to provide a method of the type described in the opening paragraph, which combines hierarchical navigation with selection of filter criteria in an improved way.

It is a second object of the invention to provide a device of the type described in the opening paragraph, which combines hierarchical navigation with selection of filter criteria in an improved way.

According to the invention, the first object is realized in that the method comprises the steps of allowing the user to select a point in the hierarchy in a first view, allowing the user to select criteria from a list of criteria in a second view, the criteria being used to filter items from the collection of items, determining which specific ones of said criteria match none of the items corresponding to said selected point in the hierarchy, and unselecting said specific criteria in said second view. By not just offering both an hierarchical view and a view in which a user can select filter criteria from a list of criteria, but by using the currently selected point in the hierarchy to adapt which filter criteria are/can be used to filter the items, a user can select one or more desired item from the collection of items faster. Furthermore, the user is shown what impact his or her hierarchical selection has on the applicable/useful filter criteria, i.e. which features are present in the items corresponding to the selected point in the hierarchy. A point in the hierarchy may be, for example, a category or subcategory of items. Items corresponding to a selected point in the hierarchy are preferably items below the selected point in the hierarchy.

In an embodiment of the method of the invention, only one of the first view and the second view is shown at a time. A user may be allowed to switch between the first view and the second view. Showing only one of the views at a time saves screen space, which can be used for showing other information. Preferably, the first view and the second view are located in the same area of the screen. Switching/flipping between these views only has to have effect on this area of the screen.

The items may comprise products. The method of the invention is very useful for allowing users to find support materials for their products, but can also be used to allow users to browse images or songs, for example.

The first view and the second view may be presented on at least one Internet page. In case of product support, an Internet page is the most convenient way to provide access to support materials, but the method can also be used by embedded software, for example. This software may be embedded in media players or mobile phones, for example.

Unselecting said specific criteria in said second view may comprise disabling selection of the specific criteria in said second view. This prevents users from selecting criteria that would result in no items being presented that correspond to said selected point in the hierarchy, e.g. no items that belong to the currently selected category or subcategory.

Unselecting said specific criteria in said second view may comprise removing a default selection of the specific criteria in said second view. This facilitates the user in not selecting criteria that would result in no items being presented that correspond to said selected point in the hierarchy, but also allows the user to reconsider and re-select a removed default selection. Removing a default selection may comprise, for example, removing a check from a checkbox corresponding to a criterion.

The method may further comprise the step of determining which items match the selected criteria and displaying said determined items upon a user changing the selection of at least one of the criteria. Giving immediate feedback to a user who changes his selection of criteria improves the speed of selecting at least one desired item even further.

The method may further comprise the step of selecting a point in the hierarchy in the second view based on an item selected by the user from the collection of items upon the user selecting the item. In addition to the use of input in the first view for presenting the second view, input in the second view can also be used for presenting the first view. When a user selects an item in the first view, the categories and subcategories to which the item belongs may automatically be selected when switching back to the first view. When a user does not select an item and switches back from the second view to the first view, the first view may start at the highest point in the hierarchy or at the point in the hierarchy that was last selected in the first view.

According to the invention, the second object is realized in that the electronic circuitry of the device is operative to allow the user to select a point in the hierarchy in a first view, allow the user to select criteria from a list of criteria in a second view, the criteria being used to filter items from the collection of items, determine which specific ones of said criteria match none of the items corresponding to said selected point in the hierarchy, and unselect said specific criteria in said second view.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numerals.

DETAILED DESCRIPTION OF THE DRAWINGS

Figure 1:
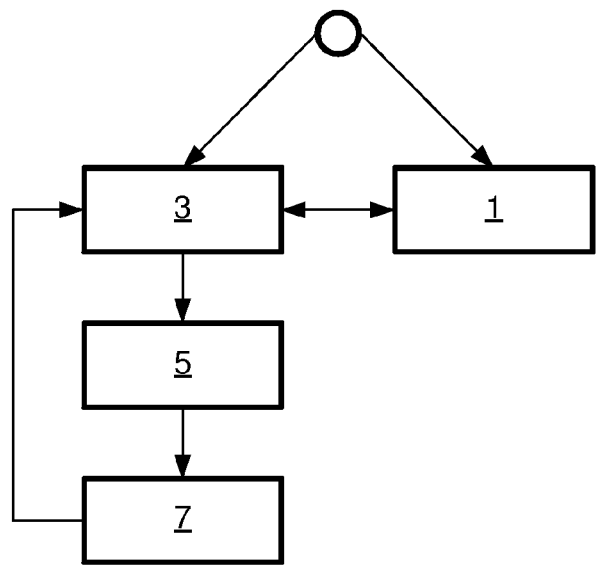
FIG. 1 is a flow diagram of the method of the invention.

The method comprises four steps, see FIG. 1. A step 1 comprises allowing the user to select a point in the hierarchy in a first view. A step 3 comprises allowing the user to select criteria from a list of criteria in a second view, the criteria being used to filter items from the collection of items. After step 3, steps 5 and 7 are performed. Step 5 comprises determining which specific ones of said criteria match none of the items corresponding to said selected point in the hierarchy. This step may comprise, for example, retrieving a list of criteria associated with said selected point in the hierarchy. Step 7 comprises unselecting said specific criteria in said second view. A user may be able to switch from the first view to the second view in step 1 and from the second view to the first view in step 3.

Figure 2:
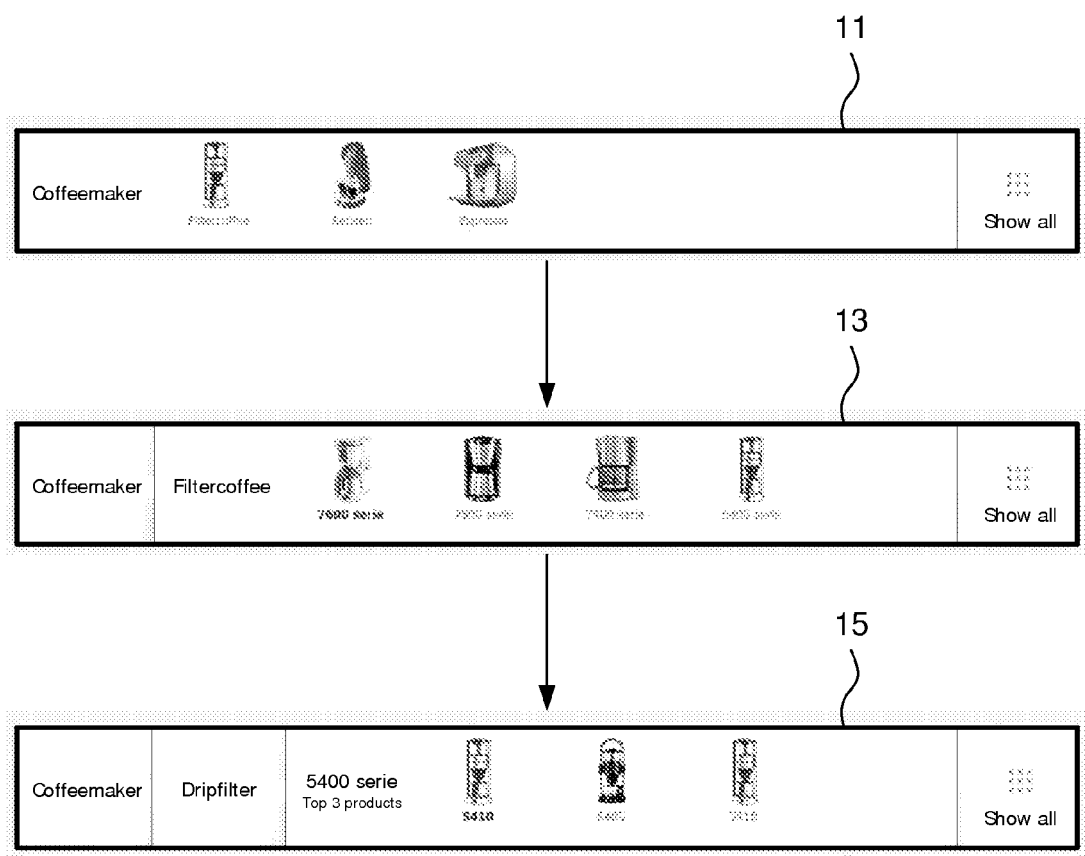
FIG. 2 shows an example of a first view created by the method of the invention.

An example of the first view is shown in FIG. 2. In a first instance 11 of the first view, only the main category has been selected: Coffeemakers. This category has three subcategories: Filtercoffee, Senseo and Espresso. In a second instance 13 of the first view, a user has selected the subcategory Filtercofee, which itself has four subcategories: 7600 series, 7500 series, 7400 series and 5400 series. In a third instance 15 of the first view, a user has selected the subcategory 5400 series, which has three products belong to it.

Figure 3:
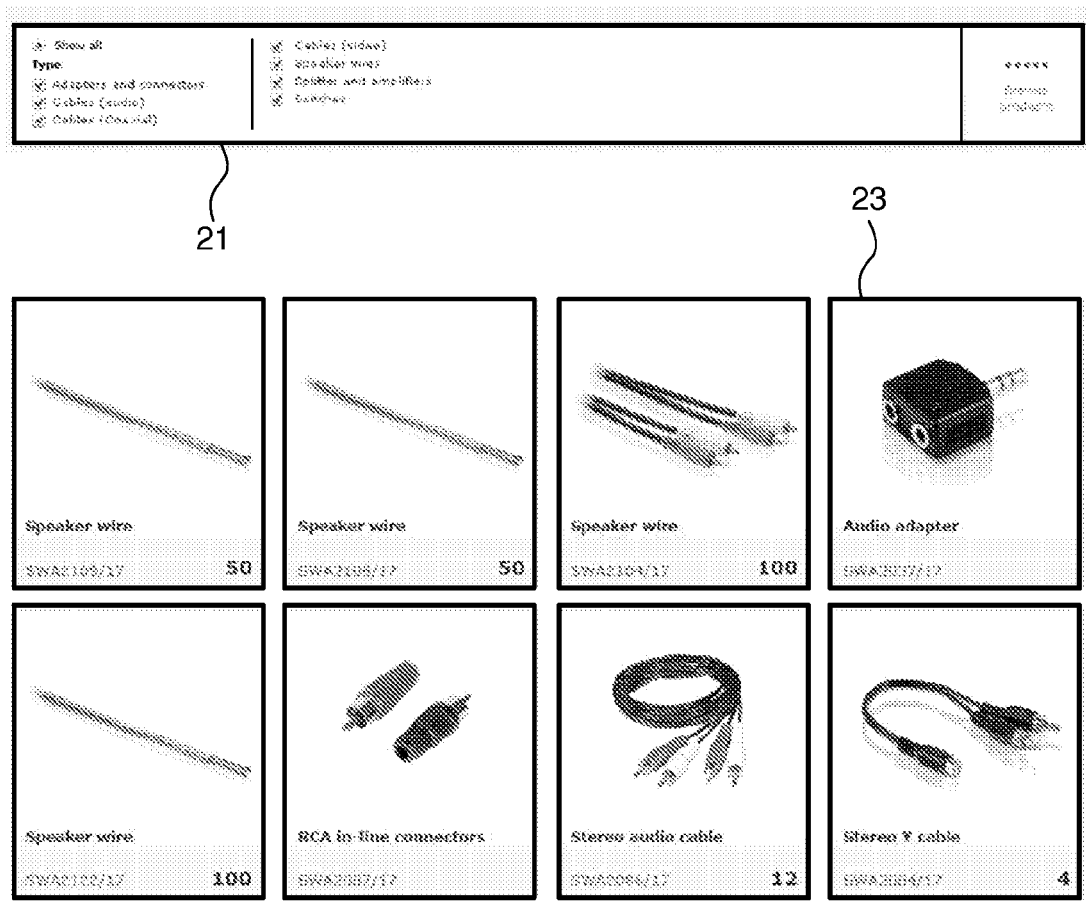
FIG. 3 shows an example of a second view created by the method of the invention.

An example of the second view is shown in FIG. 3. A user can select from a list of criteria related to the category "Cables and Connectors" in the second view 21. In this example, all criteria relate to the type of the cable or connector: "Adapters and connectors", "Cables (audio)", "Cables (Coaxial)", "Cables (video)", "Speaker wires", "Splitters and amplifiers" and "Switches". However, criteria could also relate to features, e.g. screen size, HDMI, Full HD, Digital Media Reader, in case of televisions. A certain television may have a subset or all of these features. Items matching the selected filter criteria are shown below the second view 21, e.g. Audio adapter SWA2037/17 in box 23. In a favourable embodiment, this box 23 would be removed upon a user deselecting the criterion "Adapters and connectors".

Figure 4:
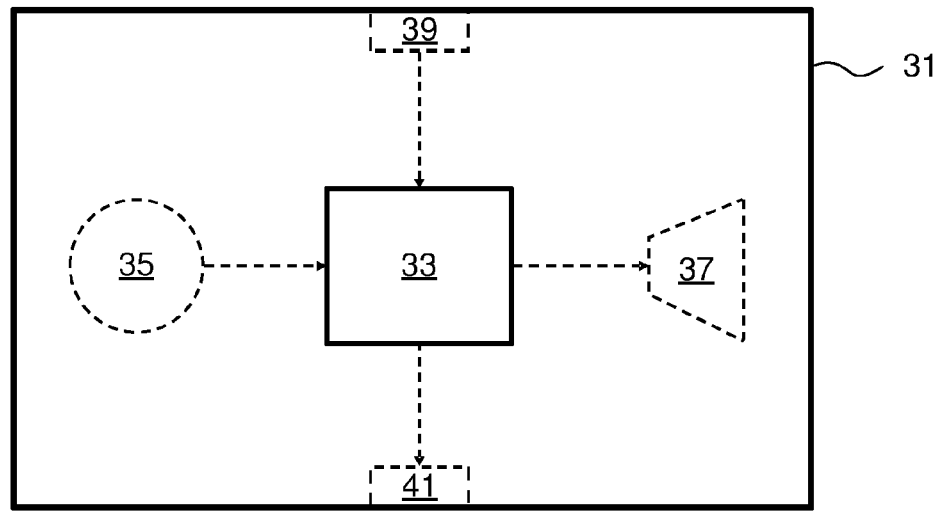
FIG. 4 is a block diagram of the device of the invention.

FIG. 4 shows the device 31 of the invention. The electronic device 31 comprises electronic circuitry 33. The electronic circuitry is operative to allow the user to select a point in the hierarchy in a first view, allow the user to select criteria from a list of criteria in a second view, the criteria being used to filter items from the collection of items, determine which specific ones of said criteria match none of the items corresponding to said selected point in the hierarchy, and unselect said specific criteria in said second view.

The device 31 may be a stationary or a portable device. The device 31 may be a consumer device, e.g. a portable music player, a mobile phone, a TV or a PC, or a professional device, e.g. a server connected to the Internet. The server may be a web server. The electronic circuitry 33 may be a general-purpose or an application-specific processor. The electronic circuitry 33 may be capable of executing a computer program. The device 31 may further comprise a storage means 35, a reproduction means 37, an input 39 and/or an output 41.

The storage means 35 may comprise, for example, a hard disk, solid-state memory, an optical disc reader or a holographic storage means. The storage means 35 may store the collection of items. The reproduction means 37 may comprise, for example, a display and/or a loud speaker. The input 39 and output 41 may comprise, for example, a network connector, e.g. a USB conneter or an Ethernet connector, an analog audio and/or video connector, such as a cinch connector or a SCART connector, or a digital audio and/or video connector, such as an HDMI or SPDIF connector. The input 39 and output 41 may comprise a wireless receiver and/or transmitter. The input 39 may comprise a broadcast receiver.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. 'Software' is to be understood to mean any software product stored on a computer-readable medium, such as a floppy disk, downloadable via a network, such as the Internet, or marketable in any other manner.

The invention claimed is:

1. A method of enabling a user to select one or more items from a collection of items, said collection of items being organized in a hierarchy, the method comprising the steps of:

allowing, via electronic circuitry, the user to select a point in the hierarchy of said collection of items shown in a first view presented on a screen;

allowing, via the electronic circuitry, the user to select criteria from a list of criteria shown in a second view presented on a same area of the screen as the first view, wherein only one of the first view and the second view is presented, via the electronic circuitry, at a time on the same area of the screen in response to a user switching, via the electronic circuitry, (i) from the first view to the second view or (ii) from the second view to the first view, the criteria being used to filter items from the collection of items to be presented on the screen, further wherein presenting only one of the first view and the second view at a time saves screen space which is used for presenting other information, the other information including items matching selected criteria, and wherein switching between the first view and the second view only has effect on the same area of the screen;

determining, via the electronic circuitry, which specific ones of said criteria from the list of criteria match no items corresponding to said selected point in the hierarchy, wherein items corresponding to said selected point in the hierarchy comprise items below the selected point in the hierarchy; and unselecting, via the electronic circuitry, said specific ones of said criteria, from the list of criteria determined to match no items corresponding to said selected point in the hierarchy, in said second view, wherein the unselecting of said specific ones of said criteria in said second view facilitates the user in not selecting criteria that would result in no items being presented on the screen that correspond to said selected point in the hierarchy.

2. The method as claimed in claim 1, wherein the items comprise products.

3. The method as claimed in claim 1, wherein the first view and the second view are presented on the screen on at least one Internet page.

4. The method as claimed in claim 1, wherein unselecting said specific ones of said criteria in said second view further comprises disabling selection of the specific criteria in said second view.

5. The method as claimed in claim 1, wherein unselecting said specific ones of said criteria in said second view further comprises removing a default selection of the specific criteria in said second view.

6. The method as claimed in claim 1, further comprising the step of determining, via the electronic circuitry, which items match the selected criteria and displaying, via the screen, said determined items in response to a user changing, via the electronic circuitry, the selection of at least one of the criteria.

7. The method as claimed in claim 1, wherein selecting a point in the hierarchy is based on an item selected by the user from the collection of items in response to the user selecting, via the electronic circuitry, the item.

8. A non-transitory computer readable medium embodied with a computer program that comprises instructions executable by a programmable device for enabling the programmable device to perform the method of claim 1.

9. A device for enabling a user to select one or more items from a collection of items, said collection of items being organized in a hierarchy, the device comprising electronic circuitry, the electronic circuitry being operative to:

allow the user to select a point in the hierarchy of said collection of items shown in a first view presented on a screen;

allow the user to select criteria from a list of criteria shown in a second view presented on a same area of the screen as the first view, wherein only one of the first view and the second view is presented at a time on the same area of the screen in response to a user switching (i) from the first view to the second view or (ii) from the second view to the first view, the criteria being used to filter items from the collection of items to be presented on the screen, further wherein presenting only one of the first view and the second view at a time saves screen space which is used for presenting other information, the other information including items matching selected criteria, and wherein switching between the first view and the second view only has effect on the same area of the screen;

determine which specific ones of said criteria from the list of criteria match no items corresponding to said selected point in the hierarchy, wherein items corresponding to said selected point in the hierarchy comprise items below the selected point in the hierarchy; and unselect said specific ones of said criteria, from the list of criteria determined to match no items corresponding to said selected point in the hierarchy, in said second view, wherein the unselecting of said specific ones of said criteria in said second view facilitates the user in not selecting criteria that would result in no items being presented on the screen that correspond to said selected point in the hierarchy.

* * * * *